US011841099B2

United States Patent
Holmberg et al.

(10) Patent No.: US 11,841,099 B2
(45) Date of Patent: Dec. 12, 2023

(54) CABLE ANCHOR ASSEMBLY

(71) Applicant: CommScope Technologies LLC, Hickory, NC (US)

(72) Inventors: Matthew J. Holmberg, Le Center, MN (US); Arend J. Turner, Minnetrista, MN (US); James J. Solheid, Minneapolis, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/179,965

(22) Filed: Feb. 19, 2021

(65) Prior Publication Data

US 2021/0262589 A1 Aug. 26, 2021

Related U.S. Application Data

(60) Provisional application No. 62/979,862, filed on Feb. 21, 2020.

(51) Int. Cl.
*F16L 3/10* (2006.01)

(52) U.S. Cl.
CPC ..................... *F16L 3/10* (2013.01)

(58) Field of Classification Search
CPC . F16L 3/10; F16L 3/106; F16L 55/178; F16L 3/12; H02G 3/305; H02G 3/32; H02G 15/007; H02G 15/013
USPC .......................................... 248/74.4, 49–74.5
See application file for complete search history.

(56) References Cited

U.S. PATENT DOCUMENTS

| | | | | |
|---|---|---|---|---|
| 2,059,532 A | * | 11/1936 | Nagel | E03C 1/306 4/255.08 |
| 3,397,431 A | * | 8/1968 | Walker | F16L 3/2235 403/372 |
| 3,592,427 A | * | 7/1971 | Misuraca | F16L 3/227 248/68.1 |
| 3,682,422 A | * | 8/1972 | Evans | F16L 3/2235 248/68.1 |
| 4,270,250 A | * | 6/1981 | Schon | F16L 3/1091 24/339 |
| 4,797,513 A | * | 1/1989 | Ono | H02G 3/22 16/2.2 |
| 5,003,130 A | * | 3/1991 | Danforth | H02G 3/083 277/606 |
| 5,499,823 A | * | 3/1996 | Fukui | H02G 3/22 174/152 G |
| 5,736,677 A | * | 4/1998 | Sato | H02G 3/22 174/152 G |
| 5,912,433 A | * | 6/1999 | Pulido | H02G 15/113 174/92 |
| 6,088,875 A | * | 7/2000 | Ono | B60R 16/0222 16/2.2 |

(Continued)

Primary Examiner — Christopher Garft
(74) Attorney, Agent, or Firm — Merchant & Gould P.C.

(57) ABSTRACT

A cable anchor assembly includes a housing that receives adhesive through a fill inlet to secure a cable relative to the housing. The cable enters and exits the housing through first and second gaskets that hold the adhesive within the housing during filling and curing. Various components enable the orientation of the fill inlet relative to the housing to be changed. In some cases, the fill inlet is defined by the housing. In other examples, the fill inlet is defined by the housing in cooperation with a guide member. In still other cases, the fill inlet is defined by one of the gaskets.

12 Claims, 10 Drawing Sheets

(56) References Cited

U.S. PATENT DOCUMENTS

| | | | |
|---|---|---|---|
| 6,402,155 B2* | 6/2002 | Sakata | B60R 16/0222 |
| | | | 174/152 G |
| 6,717,055 B2* | 4/2004 | Kato | H02G 3/32 |
| | | | 173/136 |
| 7,472,870 B2* | 1/2009 | Zagorski | F16L 59/135 |
| | | | 403/312 |
| 9,971,120 B2 | 5/2018 | Rudenick et al. | |
| 10,410,763 B2* | 9/2019 | Itou | H02G 15/003 |
| 2008/0017263 A1* | 1/2008 | Robinson | B29C 70/342 |
| | | | 138/97 |
| 2015/0184776 A1* | 7/2015 | Davies | B65D 25/00 |
| | | | 62/611 |

* cited by examiner

CABLE ANCHOR ASSEMBLY

CROSS REFERENCE TO RELATED APPLICATION

This application claims the benefit of U.S. Provisional Application No. 62/979,862, filed Feb. 21, 2020, and titled "Cable Anchor Assembly," the disclosure of which is hereby incorporated herein by reference.

BACKGROUND

Cables are often managed by securing the cables to a panel or other surface. In some cases, cables are secured using cable ties. In other cases, the cables can be crimped, clamped, or otherwise frictionally held in place. A number of problems arise with the use of such cable anchors. If the cable are held too tightly, then the cable tie/crimp/clamp may create a pinch point or other constriction, which may result in signal loss or otherwise damage the cable. However, if the cable is held too loosely, then the cables are susceptible to movement, which also can result in cable damage.

Improvements are desired.

SUMMARY

Some aspects of the disclosure are directed to a cable anchor assembly including a housing that receives adhesive through a fill inlet to secure the cable relative to the housing.

In certain implementations, the cable enters and exits the housing through first and second gaskets that hold the adhesive within the housing during filling and curing.

In certain implementations, the cable anchor assembly is assembled from a kit including various components that enable a user/technician to change the orientation of the fill inlet relative to the housing. The user selects an orientation of the anchor assembly relative to the installation site and then selects the desired orientation of the fill inlet. In certain examples, the user/technician selects components to orient the fill inlet upwardly so that gravity assists with the adhesive filling process.

In some examples, the fill inlet is defined by the housing to face in a first orientation. In other examples, the fill inlet is defined by the cooperation of the housing and a guide member so that the fill inlet faces in a second orientation different from the first orientation. In still other examples, the fill inlet is defined by one of the gaskets. In such examples, the gasket has a cable aperture and a separate access opening for the adhesive.

In certain implementations, the housing assembles around the cable or otherwise allows for lateral insertion of the cable. Accordingly, the cable can be anchored using the anchor assembly without threading an end of the cable through the anchor assembly. Therefore, the cable need not be disconnected from equipment or otherwise sized to thread through the anchor assembly. In certain examples, the gaskets also are configured to enable lateral insertion of the cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
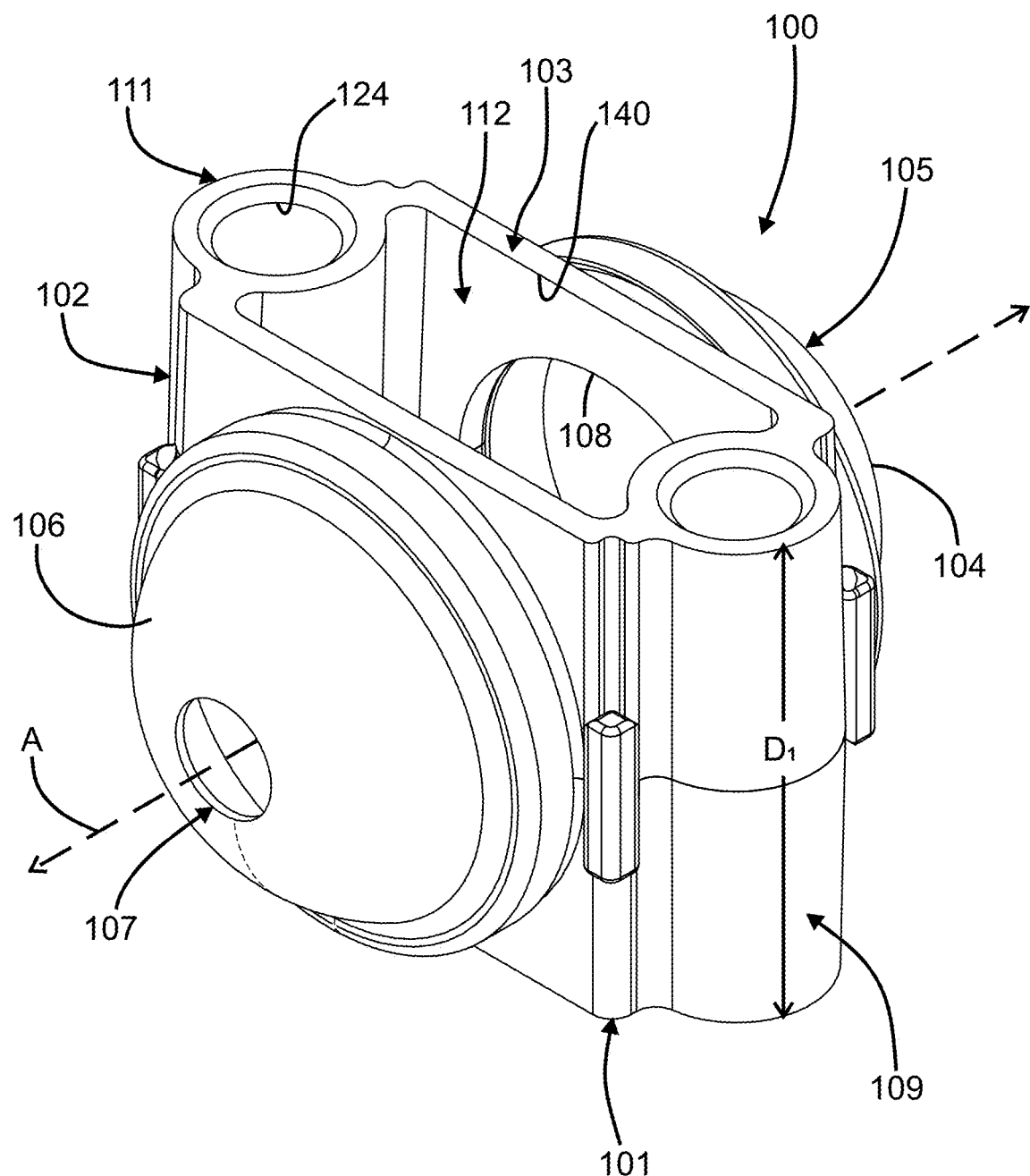
FIG. 1 is a perspective view of a first example cable anchor assembly configured in accordance with the principles of the present disclosure, the first cable anchor assembly including a housing and two gaskets implemented using a first gasket design.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a cable anchor assembly 100, 150, 160 including a housing 102. The anchor assembly 100, 150, 160 extends along a first dimension D1 (e.g., a height) between a mounting end 101 and an opposite end 103. The anchor assembly 100, 150, 160 also extends along a second dimension D2 (e.g., a depth) between opposite first and second cable ends 105, 107. The anchor assembly 100, 150, 160 also extends along a third dimension (e.g., a width) between opposite first and second ends 109, 111.

Referring to the figures in general, the housing 102 defines an interior 112 accessible through opposite first and second openings 108, 110. The first and second openings 108, 110 align along an axis A to define a cable passage. The first opening 108 is disposed at the first cable end 105 of the anchor assembly 100, 150, 160 and the second opening 110 is disposed at the second cable end 107. The cable anchor assembly 100, 150, 160 also defines a fill inlet 118 through which adhesive E can be provided to the interior 112.

A cable C can be secured to an installation surface by routing the cable C through the cable passage (or assembling the housing 102 around the cable C); providing adhesive (e.g., epoxy) E to the interior 112 of the housing 102 so that the adhesive E solidifies/cures around the cable C within the housing 102; and securing the housing 102 to the surface. In certain examples, the adhesive E holds the cable C at an axially and/or rotationally fixed position relative to the housing 102. In certain examples, the adhesive E holds the cable C without any pinch points or other constrictions. In certain implementations, the housing 102 may be removably attached to the surface so that the cable C can be released from the surface without breaking the adhesive E.

In certain implementations, the same housing 102 can be used with different accessories to select one of multiple possible placements for the fill inlet 118 as will be discussed herein. In some implementations, the fill inlet 118 of the anchor assembly 100 is defined by the housing 102 (see FIGS. 1-5). In other implementations, the fill inlet 118 of the anchor assembly 150 is defined by a cooperation between the housing 102 and a guide member 152 mounted thereto (see FIGS. 6 and 7). In still other implementations, the fill inlet 118 of the anchor assembly 160 is defined by one of the gaskets 104, 106 (see FIGS. 8-10).

In some implementations, the cable anchor assembly 100, 150, 160 is used with cables sized to fill the first and second openings 108, 110. In other implementations, the cable anchor assembly 100, 150, 160 also may include a first gasket 104 and a second gasket 106 to accommodate a range of cable sizes. The first gasket 104 extends across the first opening 108 and the second gasket 106 extends across the second opening 110. Each gasket 104, 106 defines an aperture 114, 116 that is smaller than the respective opening 108, 110. The first and second gaskets 104, 106 is sufficiently flexible/deformable to allow the respective apertures 114, 116 to stretch around cables to accommodate cables of various sizes. Accordingly, the gaskets 104, 106 cover the space between an exterior of the cable C and the respective opening 108, 110 to hold the adhesive E within the housing 102.

In certain implementations, the apertures 114, 116 are sized to fit cables ranging in diameter from about 5 mm to about 50 mm. In certain implementations, the apertures 114, 116 are sized to fit cables ranging in diameter from about 10 mm to about 40 mm. In certain implementations, the apertures 114, 116 are sized to fit cables ranging in diameter from about 10 mm to about 30 mm. In certain implementations, the apertures 114, 116 are sized to fit cables ranging in diameter from about 5 mm to about 30 mm. In certain implementations, the apertures 114, 116 are sized to fit cables ranging in diameter from about 10 mm to about 20 mm. In certain implementations, the apertures 114, 116 are sized to fit cables ranging in diameter from about 20 mm to about 30 mm. Referring back to the figures in general, the first and second gaskets 104, 106 retain the adhesive E within the interior 112 of the housing 102 while the adhesive E is solidifying (e.g., curing). In certain implementations, the solid adhesive E holds the first and second gaskets 104, 106 to the housing 102. In certain implementations, the first gasket 104 is press-fit to the housing 102 prior to the adhesive E solidifying. In some examples, the second gasket 106 is press-fit to the housing 102 prior to the epoxy E solidifying. In other examples, the second gasket 106 is latched to the housing 102 prior to the adhesive E solidifying. In other implementations, the first and second gaskets 104, 106 can be otherwise secured to the housing 102 prior to the adhesive E solidifying.

In certain implementations, the housing 102 includes a mounting surface 115 configured to contact the installation surface to which the housing 102 is mounted. The mounting surface 115 faces away from the axis A. In certain implementations, the mounting surface 115 faces in a direction transverse to the axis A. In some implementations, the mounting surface 115 is planar. In other implementations, the mounting surface 115 can be contoured (e.g., curved). In still other implementations, the mounting surface 115 may be a separate piece that mounts over an opening defined by the housing 102.

In certain implementations, the mounting surface 115 defines a fastener opening 120 through which a fastener (e.g., a screw, a bolt, a rivet, etc.) may extend into the installation surface. In certain examples, the mounting surface 115 defines two fastener openings 120 at opposite sides of the housing 102. In certain implementations, the housing 102 defines a fastener receptacle 122 that extends along a cross-dimension (e.g., a height, a width, a depth) of the housing 102 from each fastener opening 120. The fastener receptacle 122 defines an open end 124 opposite the fastener opening 120. The fastener receptacle 122 defines a passage through which the fastener may extend to reach the fastener opening 120.

In certain examples, the passage of the fastener receptacle 122 is isolated from the interior 112 of the housing 102. This isolation inhibits the adhesive E provided within the housing interior 112 from entering the fastener receptacles 122 or otherwise contacting the fasteners. Therefore, the fasteners can be removed from the fastener receptacles 122 even after the adhesive E is cured or otherwise solidified to hold the cable C to the housing 102. Accordingly, the housing 102 is removably attached to the installation surface while the cable C is fixedly attached to the housing 102.

Figure 2:
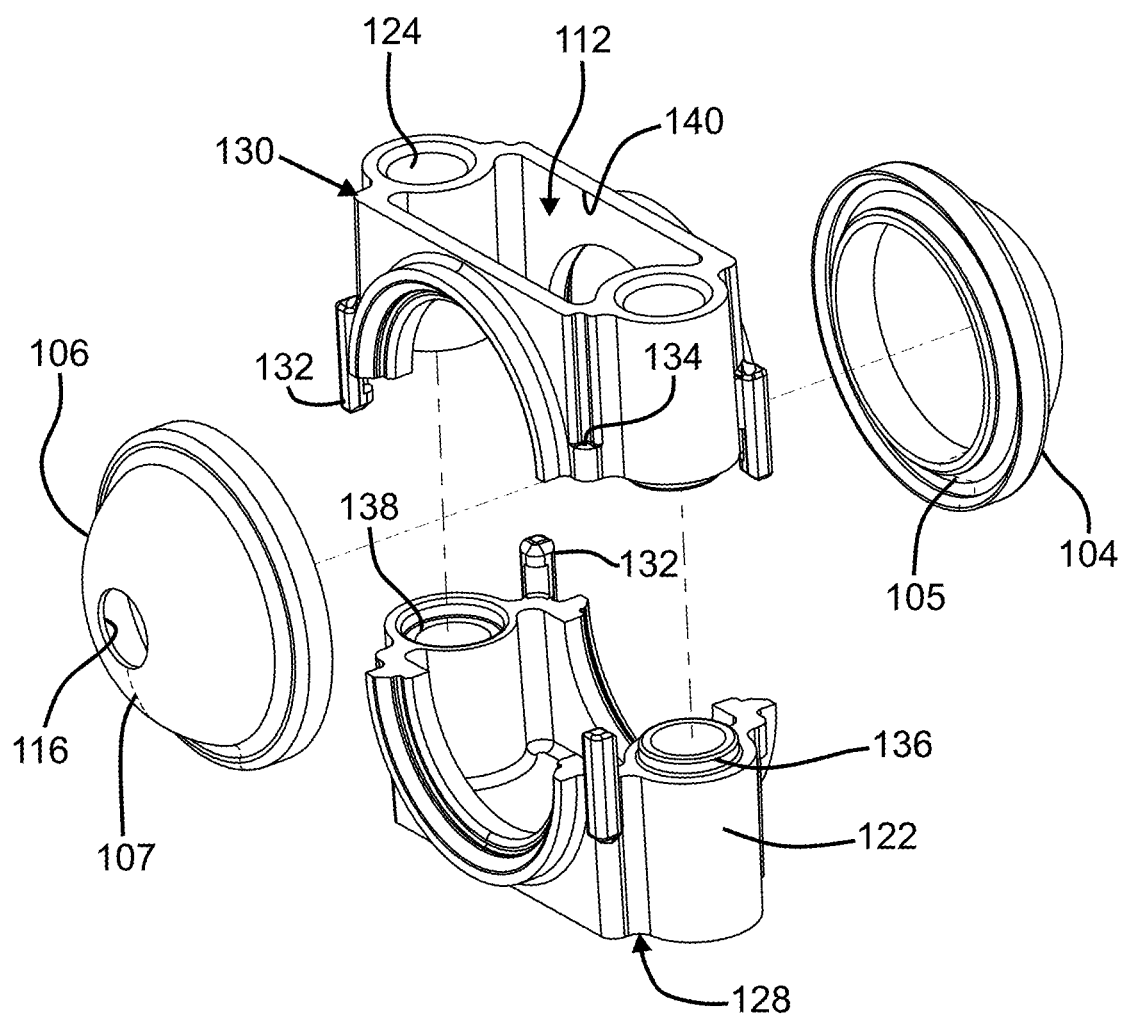
FIG. 2 is an exploded view of the first cable anchor assembly of FIG. 1.

As shown in FIG. 2, certain implementations of the cable anchor assembly 100, 150, 160 can be configured to assemble around the cable C. Assembling the housing 102 around a cable C facilitates anchoring the cable C even if the cable C is already connected to equipment or terminated at a connectorized end too large to be threaded through the cable assembly 100, 150, 160. In some examples, the housing 102 may have a clam-shell style configuration to enable flexing of the housing 102 around the cable C. In other examples, the housing 102 may be formed in multiple pieces that cooperate to define the interior 112. In certain examples, the housing 102 includes a first piece 128 and a separate second piece 130 that couple together to define the interior 112. The cable C can be sandwiched between the first and second pieces 128, 130.

In certain implementations, the first and second pieces 128, 130 mechanically couple together prior to the insertion of the adhesive E. In certain examples, the first and second pieces 128, 130 latch together. In certain examples, each of the pieces 128, 130 includes at least one latch finger 132 and at least one catch surface 134. The latch finger 132 of each piece 128, 130 engages the catch surface 134 of the other piece 130, 128. In the example shown, each piece 128, 130 includes two latch fingers 132 and two catch surfaces 134.

In certain implementations, the first and second pieces 128, 130 have an alignment arrangement to further hold the pieces together. In certain implementations, each piece 128, 130 forms part of the fastener receptacle 122. One of the pieces 128, 130 includes a protruding portion 136 and the other of the pieces 130, 128 includes a recessed surface 138 against which the protruding portion 136 abuts. In the example shown, the housing 102 includes two fastener receptacles 122. Each piece 128, 130 includes a protruding portion 136 of one of the fastener receptacles 122 and the recessed surface 138 of the other fastener receptacle 122.

In certain implementations, the gaskets 104, 106 are configured to facilitate lateral insertion of the cable C. Allowing lateral insertion of the cable C into the gaskets 104, 106 facilitates anchoring the cable C even if the cable C is already connected to equipment or terminated at a connectorized end too large to be threaded through the apertures 114, 116 of the gaskets 104, 106. In certain examples, each gasket 104, 106 defines a slit 105, 107 that extends from a periphery of the gasket 104, 106 to the aperture 114, 116, respectively. The cable C can be laterally slid along the slit 105, 107 to mount the cable C within the gasket 104, 106.

In certain implementations, the housing 102 defines a third opening 140 (FIG. 1) leading to the interior 112 of the housing 102. The third opening 140 is offset from the axis A of the cable passage. In certain examples, the third opening 140 is disposed opposite the mounting surface 115. In certain implementations, the third opening 140 extends fully across the cable passage to provide access to the housing interior 112 at opposite sides of any cable extending through the cable passage. In certain examples, the third opening 140 extends over a majority of the second cross-dimension D2 of the housing 102. In certain examples, the third opening 140 extends over a majority of the third cross-dimension of the housing 102.

Figure 3:
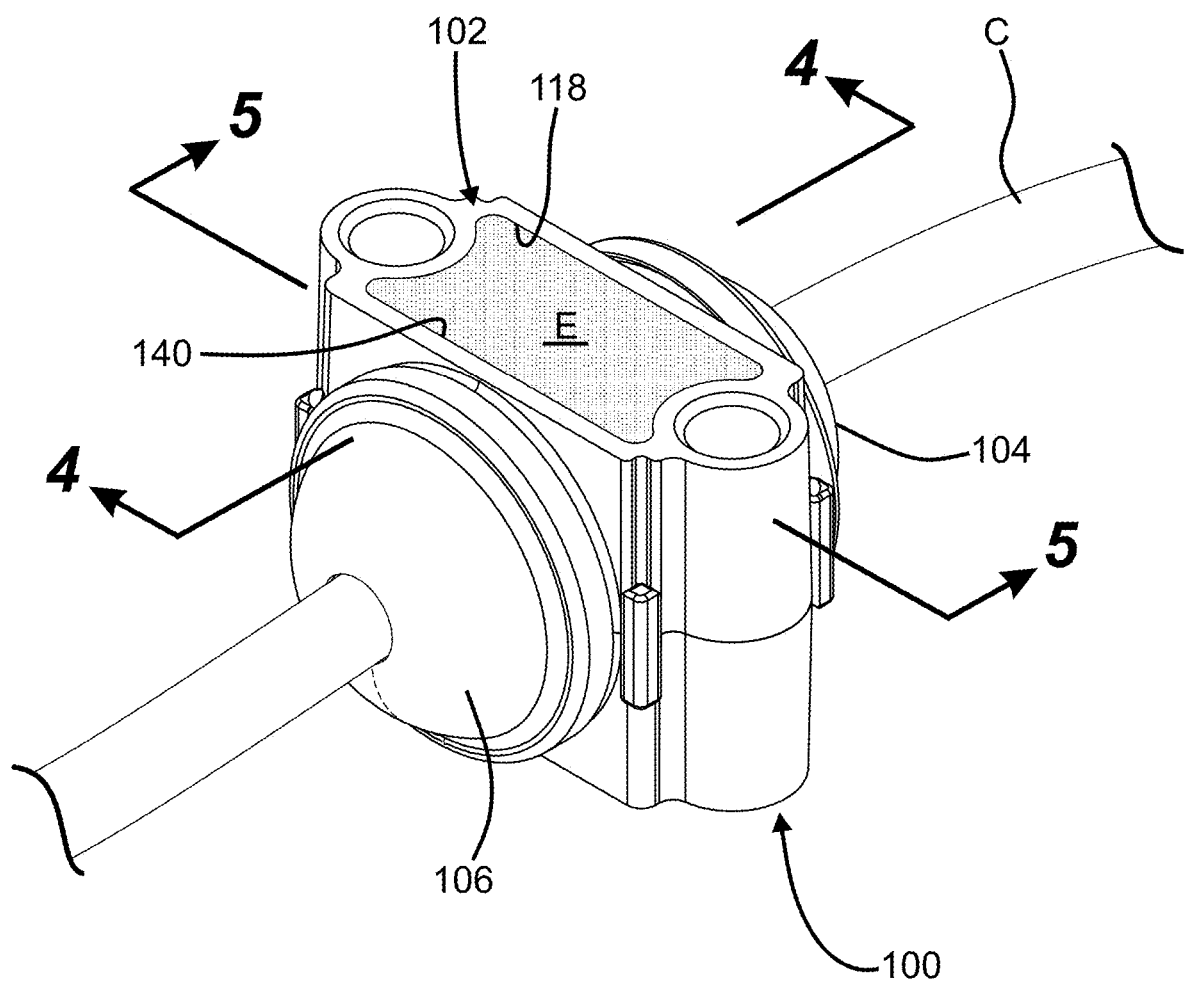
FIG. 3 shows a cable routed through and epoxied within the cable anchor assembly of FIG. 1.
Figure 4:
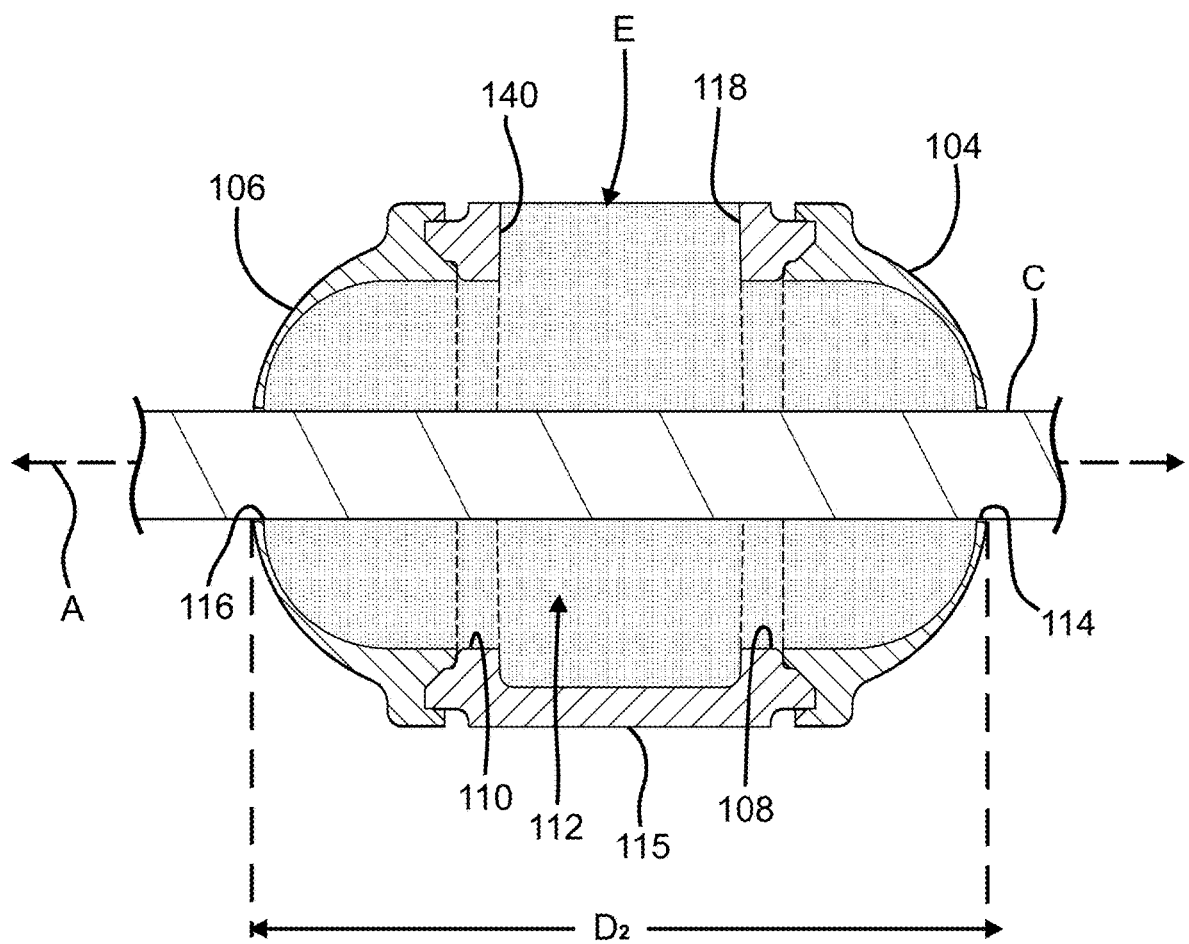
FIG. 4 is a cross-sectional view of the cable anchor assembly of FIG. 3 taken along the 4-4 section line.
Figure 5:
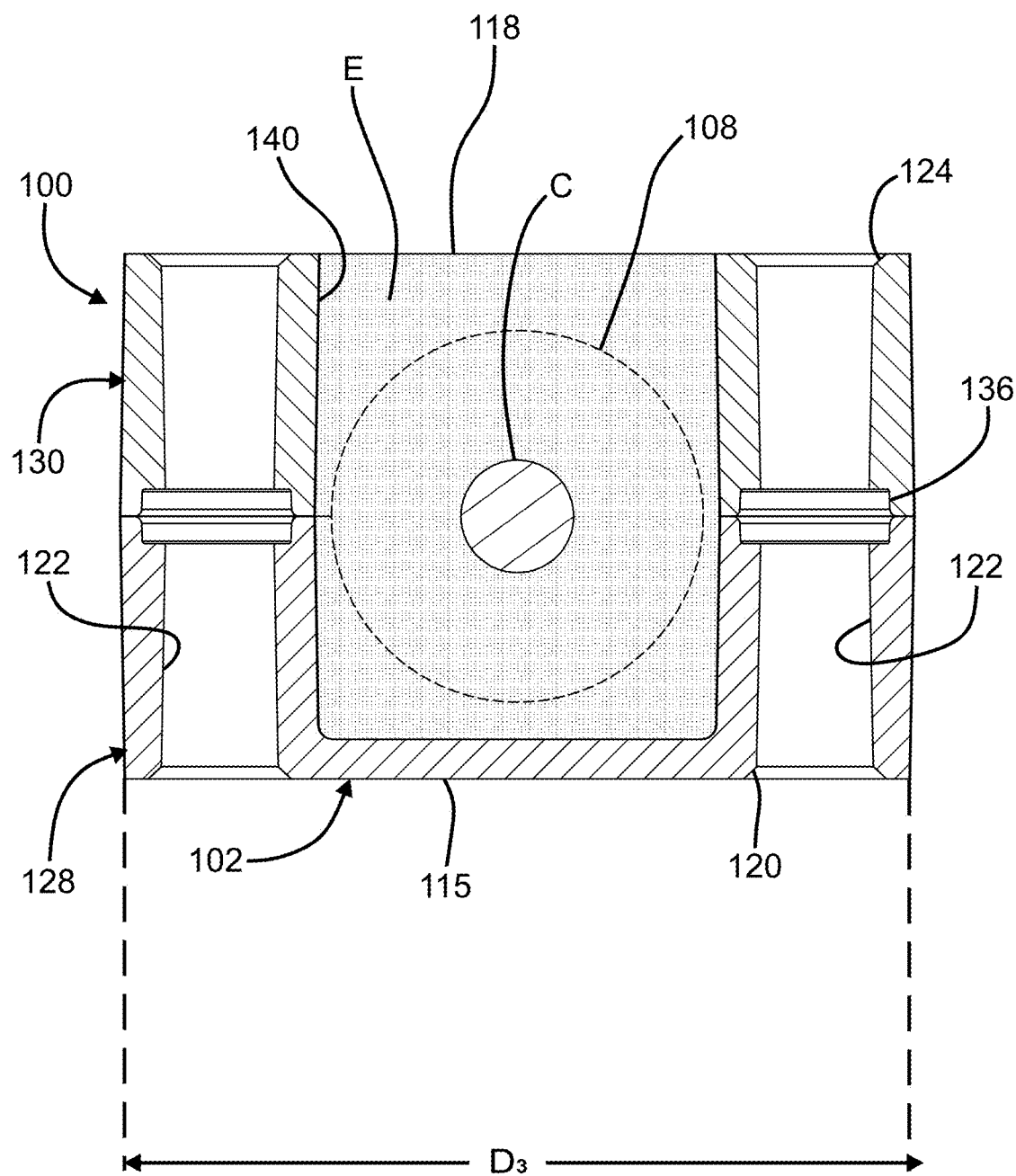
FIG. 5 is a cross-sectional view of the cable anchor assembly of FIG. 3 taken along the 5-5 section line.

As shown in FIGS. 3-5, the third opening 140 may form the fill inlet 118. Adhesive may be injected or otherwise introduced into the interior 112 of the housing 102 via the fill inlet 118. In certain implementations, the adhesive E affixes the cable C to a fixed axial position relative to the housing 102. In certain examples, the adhesive E fully surrounds the cable C (e.g., see FIGS. 4 and 5). In certain examples, the adhesive E fully fills the interior 112 of the housing 102. In certain examples, the adhesive E extends through the openings 108, 110 of the housing 102 and into spaces defined by the gaskets 104, 106.

In some implementations, the cable anchor assembly is used to secure a cable C to a horizontal or mostly horizontal surface. For example, a cable anchor assembly 100 can be oriented so that the mounting surface 115 seats on the horizontal surface and the third opening 140 faces upwardly away from the horizontal surface. In such examples, gravity assists the adhesive E to flow into the interior 112 and around the cable C. In other implementations, the cable anchor assembly is used to secure a cable C to a vertical or mostly vertical surface. For example, a cable anchor assembly 150 can be oriented so that the mounting surface 115 abuts the vertical surface and the third opening 140 faces away from the vertical surface in a generally horizontal direction. In such examples, a guide member can be utilized to facilitate injecting the adhesive E into and retaining the adhesive E within the interior 112.

In some implementations, the cable C is secured within the cable anchor assembly 100 in a factory before being shipped to an installation site. For example, the housing 102 and gaskets 104, 106 can be installed around the cable C in the factory and the adhesive E can be injected into the housing 102 in the factory. After shipping, the cable anchor assembly 100 can be mounted at an installation surface at the installation site. In other implementations, the cable C can be secured within the cable anchor assembly 100 at the installation site. In some examples, the adhesive E is added prior to mounting the housing 102 to the installation surface. In other examples, the adhesive E is added after mounting the housing 102 to the installation surface.

In accordance with certain aspects of the disclosure, the housing 102 can be oriented within a factory setting to orient the third opening 140 to allow gravity to guide the adhesive E through the housing 102. However, introducing the adhesive E into the housing 102 in the field (e.g., at the installation site) may present challenges in that the third opening 140 may not be orientable in a vertically upward direction. In some such cases, one or more components may be added to the housing 102 to facilitate introduction of the adhesive E into a housing having a less favorable orientation (e.g., an orientation where gravity would result in the adhesive E flowing out of the housing without fully surrounding the cable C).

Figure 6:
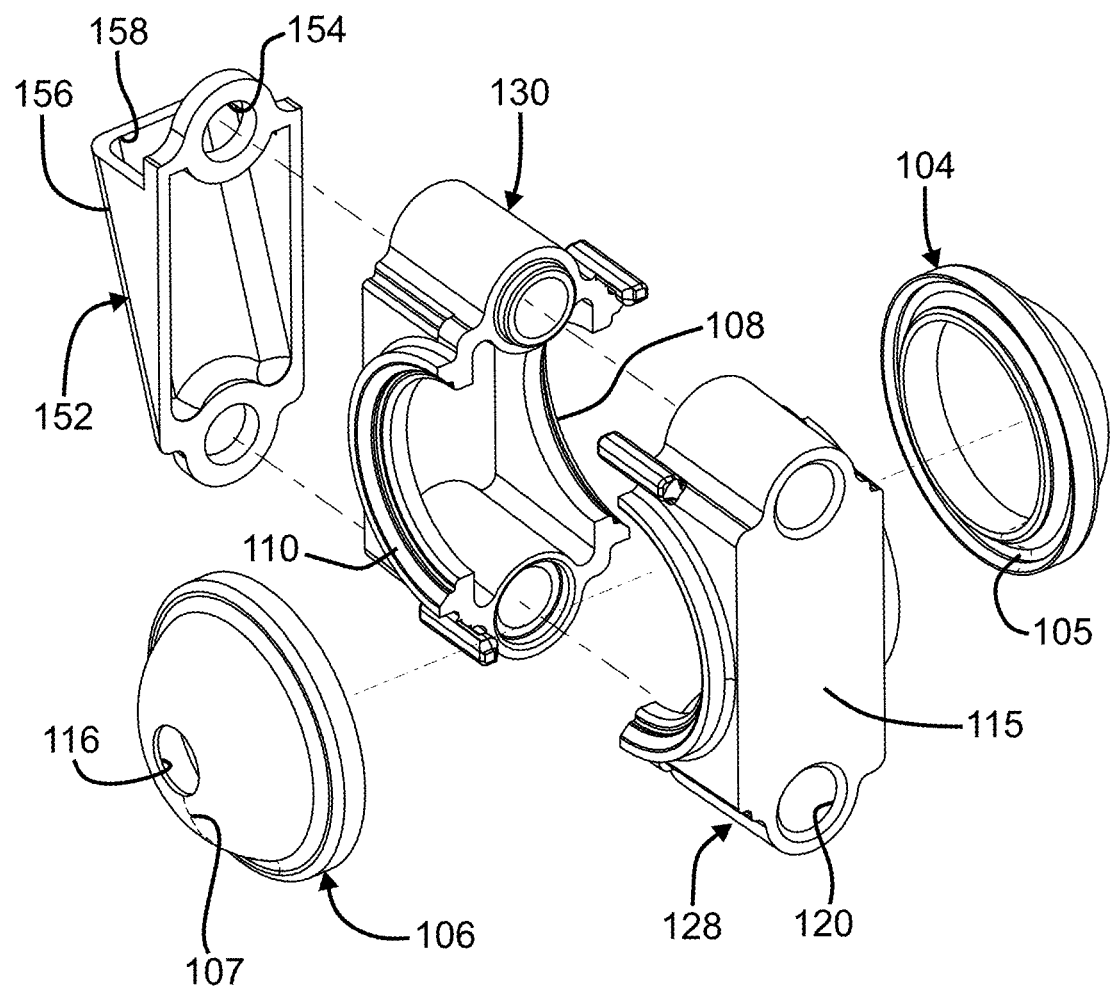
FIG. 6 is a perspective view of a second example cable anchor assembly configured in accordance with the principles of the present disclosure.
Figure 7:
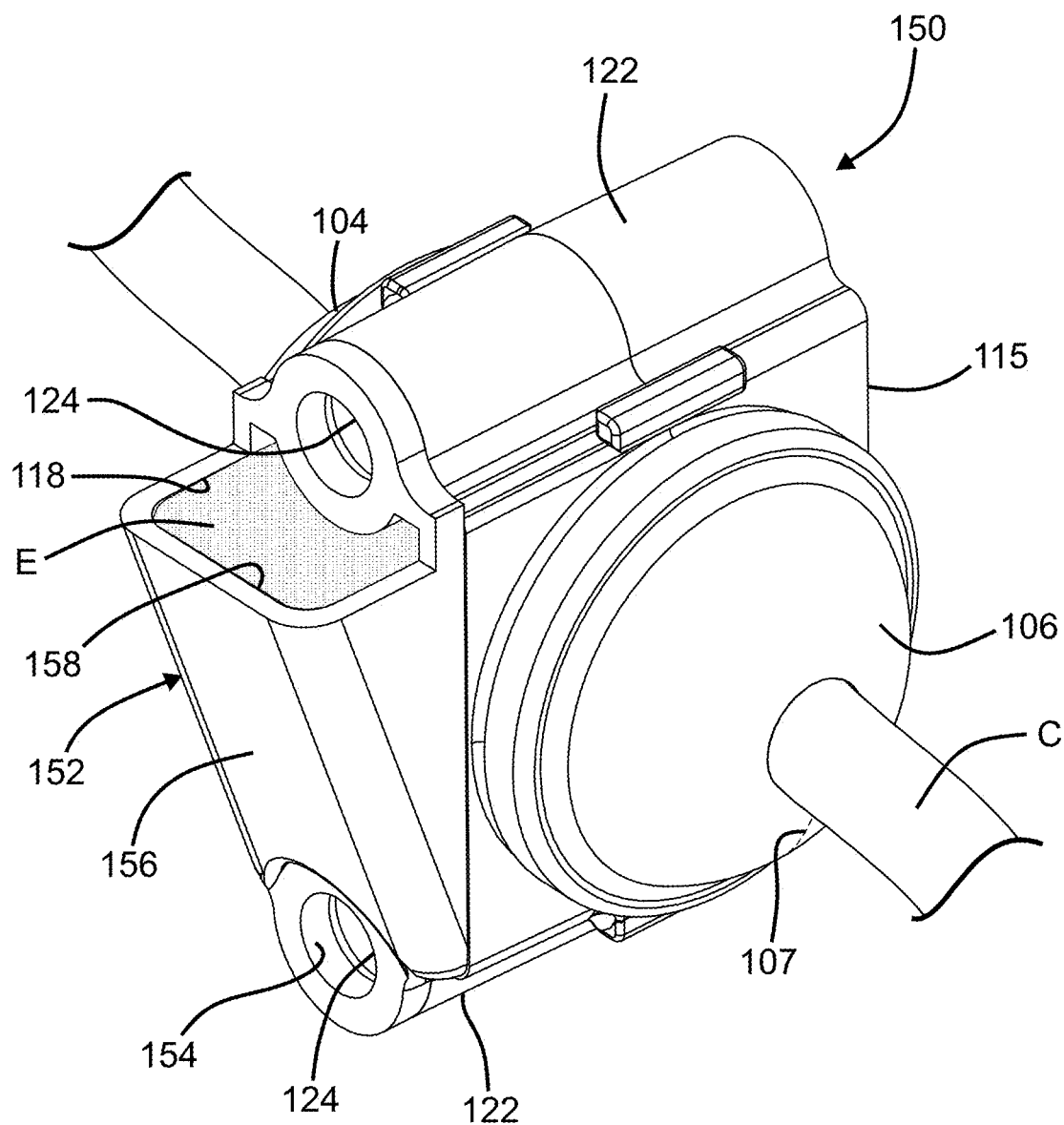
FIG. 7 shows a cable routed through and epoxied within the cable anchor assembly of FIG. 6.

FIGS. 6 and 7 illustrate an example cable anchor assembly 150 that utilizes the housing 102 and gaskets 104, 106 of the cable anchor assembly 100 of FIGS. 1-5 along with an example guide member 152. The guide member 152 mounts over the third opening 140 to change the orientation of the fill inlet 118. In certain implementations, the guide member 152 can be attached in any of multiple positions so that the user can select an orientation of the fill inlet 118. In the example shown, the guide member 152 can be attached in one of two positions.

The guide member 152 includes a mounting structure 154, a guide body 156, and an access opening 158. The access opening 158 forms the fill inlet 118. The mounting structure 154 allows the guide member 152 to be mounted to the housing 102. In certain examples, the mounting structure 154 includes one or more fastener openings that align with the receptacles 122 and/or fastener openings 120 of the housing 102. Accordingly, the same fastener can both hold the guide member 152 to the housing 102 and hold the housing 102 to the installation surface (e.g., a vertical surface).

In some implementations, the guide member 152 aligns with the housing 102 so that a first fastener opening of the mounting structure 154 aligns with the open end 124 of a first receptacle 122 of the housing 102 and a second fastener opening of the mounting structure 154 aligns with a second receptacle 122 of the housing 102. In other implementations, the guide member 152 is rotated 180 degrees relative to the housing 102 so that the first fastener opening of the mounting structure 154 aligns with the open end 124 of the second receptacle 122 of the housing 102 and the second fastener opening of the mounting structure 154 aligns with the first receptacle 122 of the housing 102. The user/technician selects the position of the guide member 152 to face the access opening 158 upwardly to facilitate injection of the adhesive E.

The guide body 156 of the guide member 152 provides a path from the access opening 158 to the interior 112 of the housing 102. In certain examples, the guide body 156 covers at least a majority of the third opening 140. In certain examples, the guide body 156 is shaped to define the access opening 158 so that the access opening 158 faces in a different direction from the third opening 140 of the housing 102. In certain examples, the guide body 156 is wedge-shaped.

Figure 8:
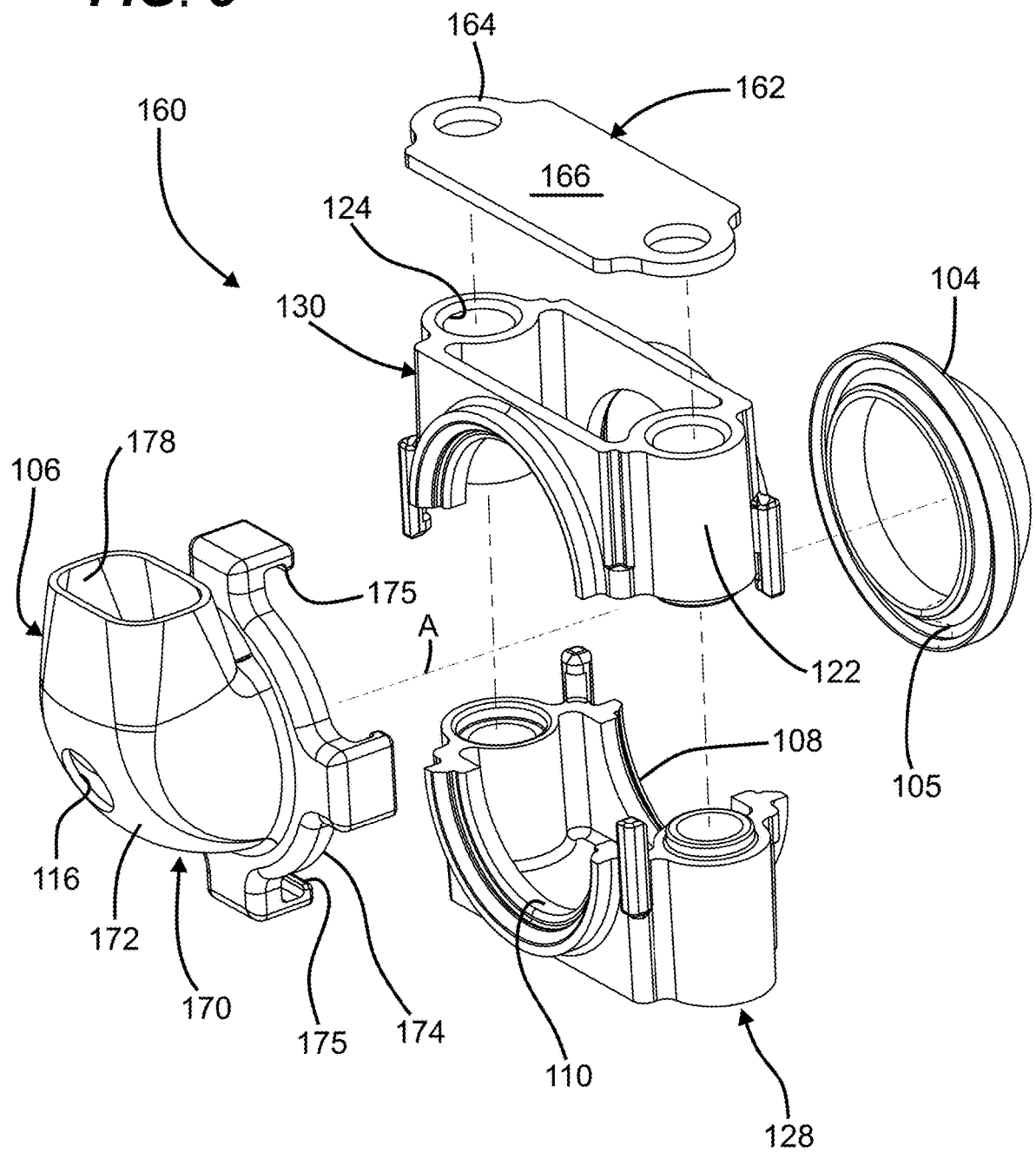
FIG. 8 is a perspective view of a third example cable anchor assembly configured in accordance with the principles of the present disclosure, the components of the third cable anchor assembly being exploded from each other for ease in viewing.
Figure 9:
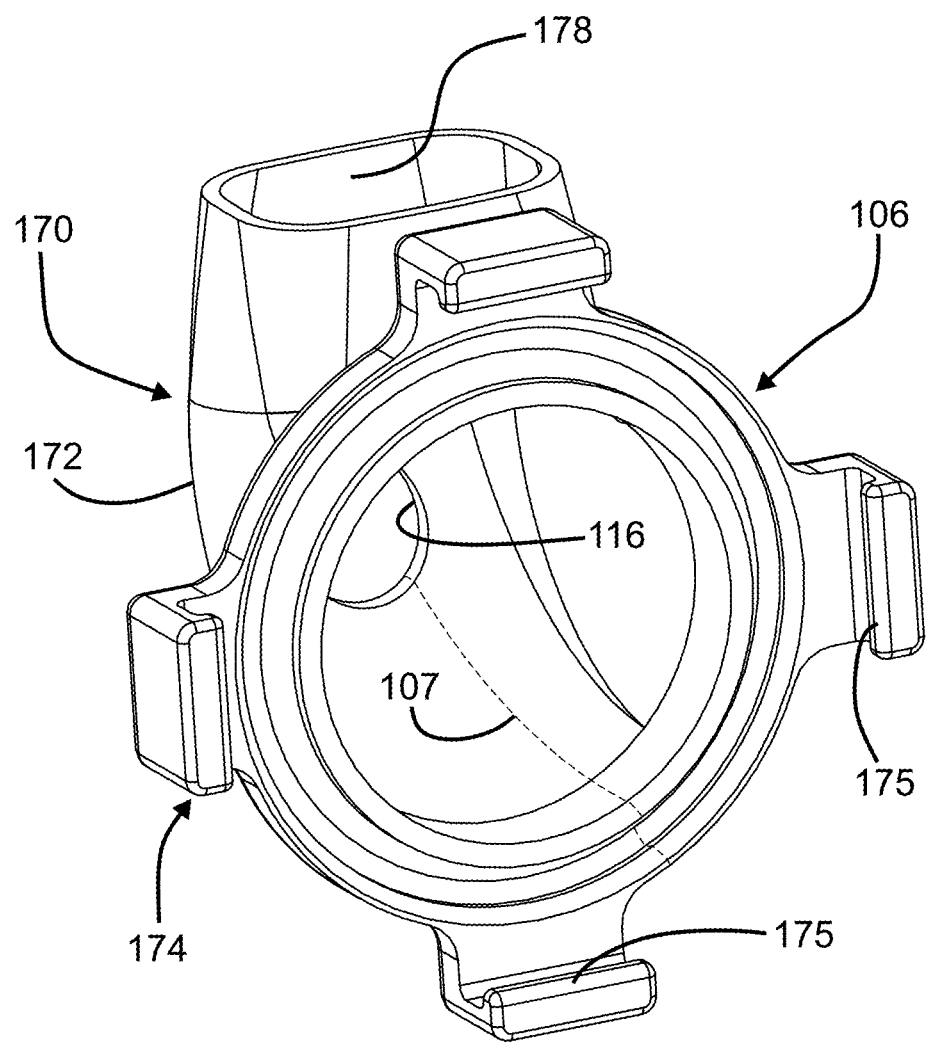
FIG. 9 is a perspective view of an example gasket implemented using an alternative gasket design in accordance with the principles of the present disclosure.
Figure 10:
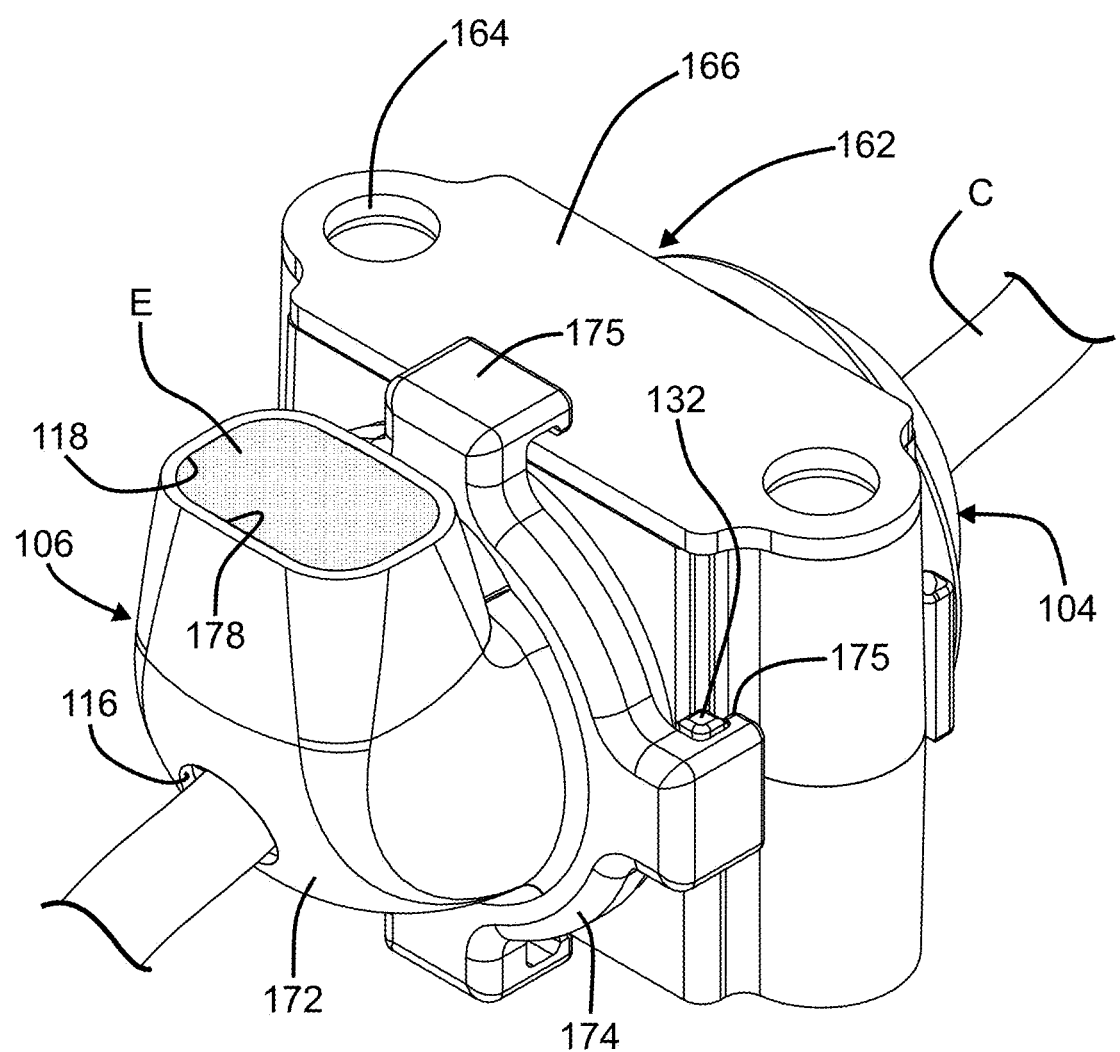
FIG. 10 shows a cable routed through and epoxied within the cable anchor assembly of FIG. 8.

FIGS. 8-10 illustrate an example cable anchor assembly 160 that utilizes the housing 102 of the cable anchor assembly 100 of FIGS. 1-5 along with a cover 162. One of the gaskets 104, 106 of the cable anchor assembly 160 is implemented using an alternative gasket design 170 that defines the fill inlet 118. The alternative gasket design 170 provides a path for the adhesive E into the interior 112 of the housing 102 through one of the first and second openings 108, 110. The alternative gasket design 170 can be used if access to the third opening 140 is blocked even with the guide member 152 (e.g., if the housing 102 is disposed directly beneath a panel, one or more cables, or other equipment).

The cover 162 includes a body 166 that extends over the third opening 140 of the housing 102. In certain examples, the cover 162 closes the third opening 140. In certain examples, the cover 162 does not define an access opening through which the interior 112 of the housing 102 can be accessed from an exterior of the cover 162. Rather, the cover body 166 blocks such access, thereby inhibiting adhesive E from entering or exiting the housing 102 through the third opening 140.

The cover 162 includes a mounting structure 164 that allows the cover 162 to be mounted to the housing 102. In certain examples, the mounting structure 164 includes one or more fastener openings that align with the receptacles 122 and/or fastener openings 120 of the housing 102. Accordingly, the same fastener can both hold the cover 162 to the housing 102 and hold the housing 102 to the installation surface (e.g., a vertical surface). In certain examples, the mounting structure 164 of the cover 162 is substantially the same as the mounting structure 154 of the guide member 152.

One of the gaskets 104, 106 of the cable anchor assembly 160 is implemented using the alternative gasket design 170. For convenience, the gasket defining the fill inlet 118 will be referred to herein as "the second gasket 106." However, it will be understood that the first gasket 104 may be implemented using the alternative gasket design 170 while the second gasket 106 shown in FIGS. 1-5 is utilized with the cable anchor assembly 160.

The gasket 160 implemented using the gasket design 170 still defines the second aperture 116 (or first aperture 114) through which the cable C extends through the gasket 170. In certain examples, the gasket design 170 also defines the slit 107 (FIG. 9) to facilitate lateral mounting of the cable C within the gasket 170. The slit 107 extends from the second aperture 116 to a mounting structure 174 of the gasket design 170. The gasket 106 implemented using the gasket design 170 is formed of a material that is sufficiently flexible to allow the cable C to slide through the slit 107 from the mounting structure 174 to the second aperture 116.

The gasket 106 implemented using the design 170 forms a conduit 172 extending from the mounting structure 174 to an access opening 178. The access opening 178 forms the fill inlet 118. The conduit 172 defines the second aperture 116 at a location spaced from the access opening 178. In certain examples, the conduit 172 orients the access opening 178 to face in a different direction from the second opening 110 of the housing 102. In certain examples, the conduit 172 orients the access opening 178 to face generally transverse to the axis A of the cable passage. In certain examples, the conduit 172 provides a curved path between the access opening 178 and the second opening 110. In the example shown, the conduit 172 tapers inwardly as the conduit 172 extends towards the access opening 178.

The mounting structure 174 holds the gasket 106 to the housing 102 at the second opening 110 (or the first opening 108). In some implementations, the mounting structure 174 press-fits to the housing 102. In other implementations, the mounting structure 174 includes latch arms 175 that snap-fit to the housing 102. For example, two of the arms 175 may snap over the latch fingers 132 of the housing pieces 128, 130 (see FIG. 10). In still other implementations, the mounting structure 174 may otherwise secure to the housing 102 to cover the second opening 110.

In certain implementations, the mounting structure 174 allows the gasket 106 implemented using the design 170 to be secured to the housing 102 in one of multiple possible orientations to allow a user to select an orientation of the fill inlet 118. Accordingly, the cable anchor assembly 160 can be used with a horizontal installation surface, a vertical installation surface, or anything in between. In some examples, the mounting structure 174 includes multiple latch arms 175 spaced around a periphery of the mounting structure 174. In the example shown, the gasket 106 can be attached to the housing 102 in any orientation where two of the latch arms 175 align with the latch arms 132 of the housing 102 for latching thereto. In other examples, the mounting structure 174 is press-fit and can be mounted in any position within a 360 degree range of movement around the cable passage axis A.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A cable anchor assembly comprising:
a housing having a first dimension extending between a first closed end and a second end, a second dimension extending transverse to the first dimension between opposite first and second cable ends, and a third dimension extending transverse to the first and second dimensions between opposite first and second closed sides to define an interior, the housing comprising a first piece and a second piece, the first piece defining at least one latch finger and the second piece defining at least one catch surface configured to receive the at least one latch finger of the first piece to mechanically couple the first piece to the second piece, the first and second cable ends defining opposite first and second openings aligned along a passage axis, the first closed end of the housing also defining a mounting surface facing in a direction transverse to the passage axis, the mounting surface of the housing defining a fastener opening, and the housing defining a third opening offset from the passage axis, the housing defining a fastener passage extending through the mounting surface, the fastener passage being isolated from the interior of the housing;
a first gasket extending outwardly away from the housing across the first opening, the first gasket defining a first aperture that is smaller than the first opening;
a second gasket extending outwardly away from the housing across the second opening, the second gasket defining a second aperture that is smaller than the second opening, the second gasket being spaced from the first gasket so that a gap extends across the interior of the housing between the first and second gaskets, wherein the gap is larger than the second dimension of the housing; and
a guide member that mounts over the third opening, the guide member defining a fill inlet facing in a different direction from the third opening.

2. The cable anchor assembly of claim 1, wherein the first and second apertures are aligned along the passage axis.

3. The cable anchor assembly of claim 1, wherein the first gasket defines a first slit extending from the first aperture to a periphery of the first gasket to enable lateral insertion of a cable into the first aperture.

4. The cable anchor assembly of claim 1, wherein the first and second gaskets are each configured to press-fit to the housing.

5. The cable anchor assembly of claim 1, wherein the housing defines a fastener receptacle extending through the housing from the fastener opening, the fastener receptacle having an open end located opposite the fastener opening.

6. The cable anchor assembly of claim 1, wherein the fill inlet faces in a direction transverse to the third opening.

7. The cable anchor assembly of claim 1, further comprising a cable extending through the interior of the housing between the first and second openings, the cable extending through the first and second apertures of the first and second gaskets, respectively.

8. The cable anchor assembly of claim 7, further comprising adhesive disposed within the housing, the adhesive surrounding the cable and contacting the first and second gaskets.

9. A cable anchor assembly comprising:
- a housing having a first dimension extending between a first closed end and a second end, a second dimension extending transverse to the first dimension between opposite first and second cable ends, and a third dimension extending transverse to the first and second dimensions between opposite first and second closed sides to define an interior, the first and second cable extends defining opposite first and second openings aligned along a passage axis, the first closed end of the housing also defining a mounting surface facing in a direction transverse to the passage axis, the mounting surface of the housing defining a fastener opening, the housing defining a fastener receptacle extending through the housing from the fastener opening, the fastener receptacle having an open end located opposite the fastener opening, and the housing defining a third opening offset from the passage axis;
- a first gasket extending across the first opening, the first gasket defining a first aperture that is smaller than the first opening;
- a second gasket extending across the second opening, the second gasket defining a second aperture that is smaller than the second opening; and
- a guide member that mounts over the third opening, the guide member defining a fill inlet facing in a different direction from the third opening.

10. The cable anchor assembly of claim 9, wherein the guide member defines a fastener opening that aligns with the open end of the fastener receptacle.

11. The cable anchor assembly of claim 9, wherein the fill inlet faces in a direction transverse to the third opening.

12. A cable assembly comprising:
- an anchor housing extending along a width between opposite side walls, along a height between a mounting surface and an access opening, and along a depth between opposite first and second ends, the anchor housing defining an interior accessible through the access opening, the first and second ends defining first and second openings that align to form a cable passage along the depth of the anchor housing, the first and second ends being at least partially defined by dome-shaped gaskets, each dome-shaped gasket being convexly curved from a respective central aperture of the dome-shaped gasket to an outer rim of the dome-shaped gasket, each dome-shaped gasket defining a slit extending from the outer rim of the dome shaped gasket to the central aperture, the width of the anchor housing being larger than the depth and the height of the anchor housing being larger than the depth;
- a cable extending through the anchor housing along the cable passage;
- a guide member that mounts over the access opening, the guide member defining a fill inlet facing in a different direction from the access opening; and
- hardened adhesive disposed within the interior of the anchor housing, the hardened adhesive surrounding the cable, the hardened adhesive affixing the cable to the anchor housing.

* * * * *